Jan. 12, 1943.　　　　　M. KEEGAN　　　　　2,308,373
COMBINATION SQUARE
Filed Dec. 8, 1939　　　　5 Sheets-Sheet 1

INVENTOR.
MALCOLM KEEGAN
BY C. Lauren Maltby
ATTORNEY.

Jan. 12, 1943.　　　　M. KEEGAN　　　　2,308,373
COMBINATION SQUARE
Filed Dec. 8, 1939　　　　5 Sheets-Sheet 2
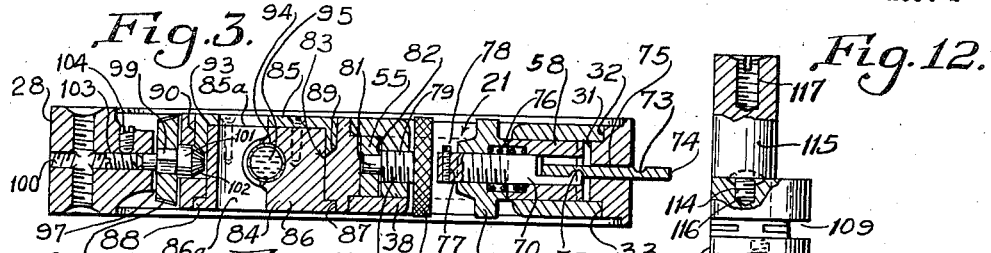
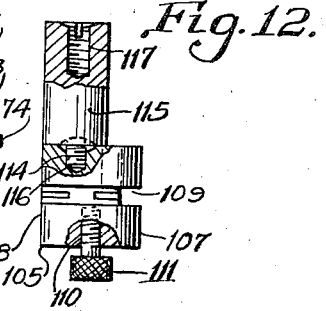
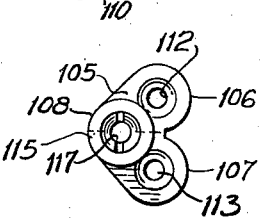
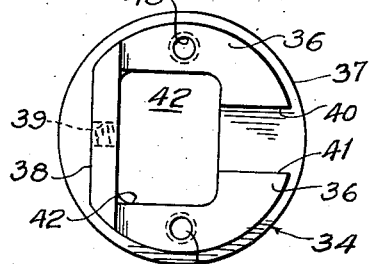
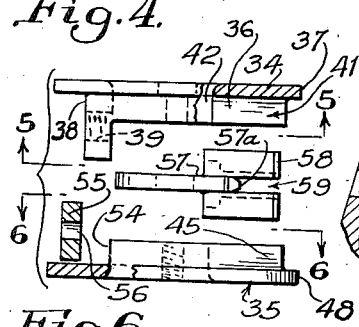
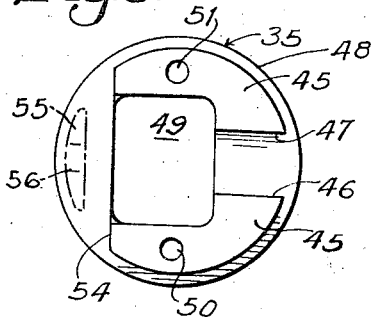
INVENTOR.
MALCOLM KEEGAN
BY C. Lauren Maloby
ATTORNEY.

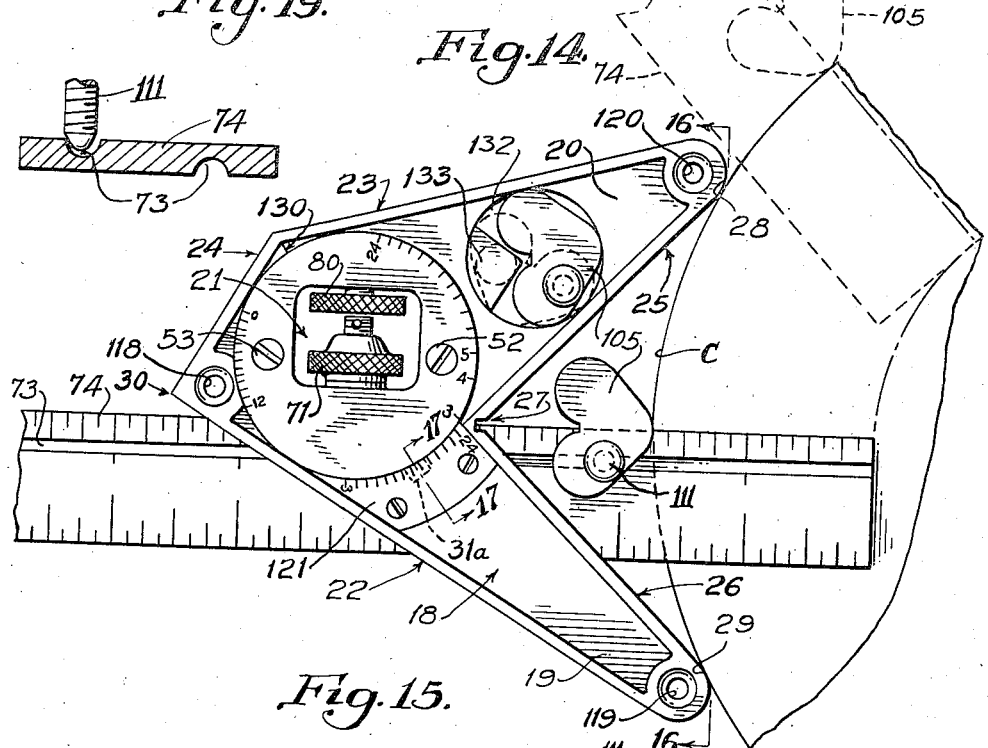

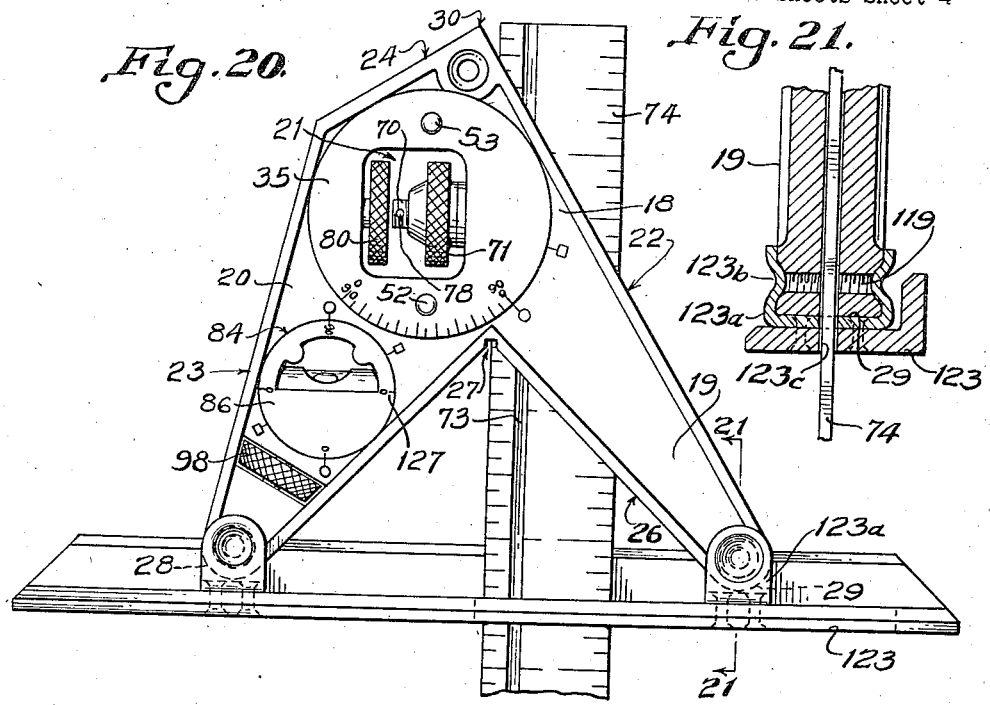
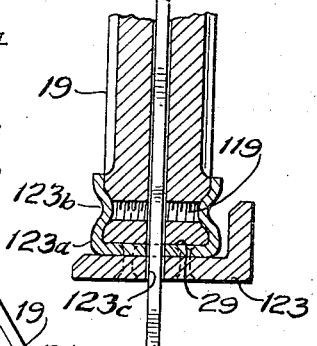
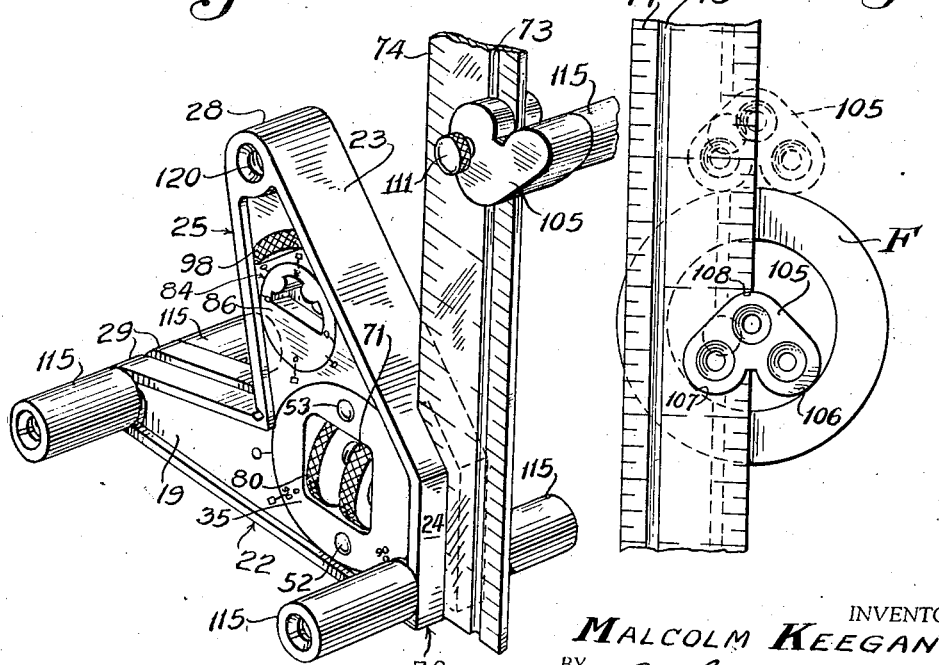

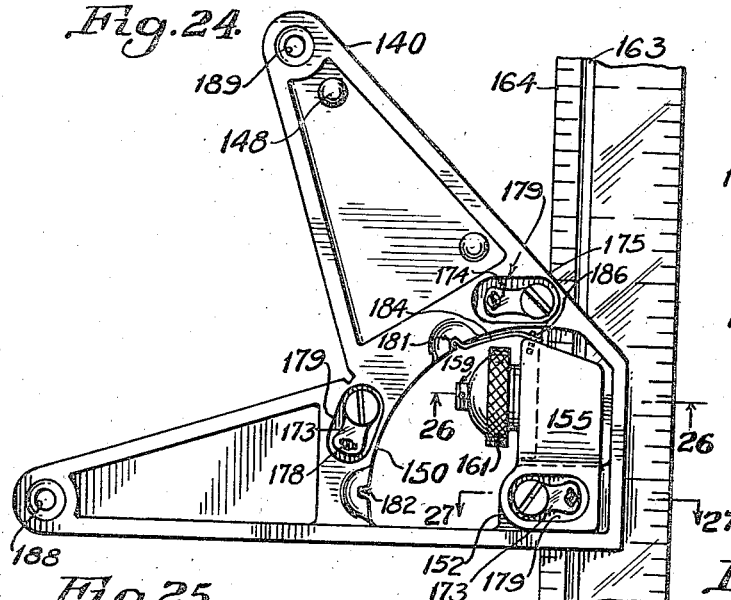
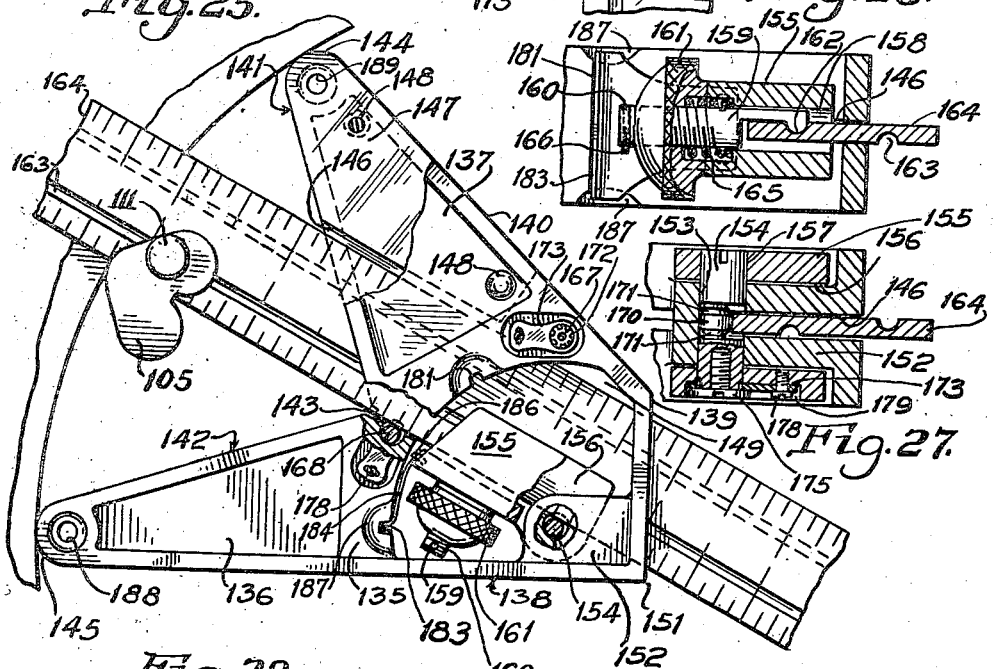
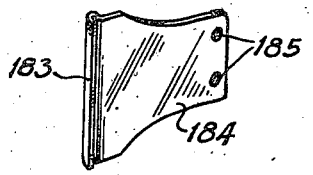

Patented Jan. 12, 1943

2,308,373

UNITED STATES PATENT OFFICE 2,308,373

COMBINATION SQUARE

Malcolm Keegan, Los Angeles, Calif.

Application December 8, 1939, Serial No. 308,203

4 Claims. (Cl. 33—94)

This invention relates to tools and more especially to a combination square, protractor and inclinometer.

A general object of the invention is to provide a unitary tool or instrument combining the features of a square, center square, bevel protractor, polygon miter, arc conformator, inclinometer, universal level and angle divider.

A specific object is to provide a tool of the character described having a plurality of circular work engaging faces adapted for use as a scribing gauge for straight, circular, oval, ogee curve, or other irregular shaped work.

Another object is to provide a new and useful gauge having a plurality of circular work engaging faces adapted to cooperate with other portions of the tool to perform functions mentioned in preceding object.

Another object is to provide a center square having adjustable blade seating means to permit lateral adjustment of the blade relative to the head to compensate for wear or minor inaccuracies in manufacture.

An additional object is to provide a protractor tool having improved indexing means to indicate a large number of polygons.

An additional object is to provide improved, simplified and economical means for reversing the blade with respect to the head of the tool.

Another object is to provide an adjustable blade tool wherein the working edge of the blade is in all positions free from any overlapping of the head.

Another object is to provide a tool adapted for defining the radii of a curved edge and for defining such radii adjacent the ends of such edges.

An additional object is to provide a tool adapted to define radii as mentioned in the preceding object wherein the edge is rounded, beveled or otherwise irregular.

Another object is to provide a bevel square with improved means of settings for the zero and 90 degree positions.

Those who are acquainted with the manufacture or use of squares of this type will no doubt notice the resemblance my improved square bears to the familiar combination square now in general use by so many classes of mechanics (sometimes referred to as the Starrett square). In this type of square there is an unused or waste portion which is occupied by a bridge of webbing which merely serves to tie the outer ends of the usual working faces together.

I show that this unused space can be used to advantage by providing therein a right angle recess enclosed by diverging straight edged working faces, which, when connected to the two customary working faces, provides in one unit the essential parts of two tools which have been heretofore manufactured and sold separately. When a pair of circular work contacting faces are used to connect the mentioned straight edged working faces together, my improved tool is shown to be entirely surrounded by an unbroken continuity of working faces.

Moreover, this is accomplished with but a small increase in weight and the overall dimensions compare very favorably with the squares now popular and in everyday use, and should find favor with those mechanics who now require several tools to perform the work that may be accomplished by this compact, convenient and unitary arrangement of parts.

The modified embodiment shown in Figs. 24 and 25 will be explained in full detail hereinafter. The following part of this disclosure is directed to that embodiment illustrated in Figs. 1 and 2.

Fig. 3 is a sectional view taken along the line 3—3 of Fig. 2;

Fig. 4 is an exploded view of the rotatable protractor head parts;

Fig. 5 is a view of one of said parts as seen from the line 5—5 of Fig. 4;

Fig. 6 is a view of another of said parts as seen from the line 6—6 of Fig. 4;

Fig. 7 is a perspective view of another of said parts;

Fig. 8 is a fragmentary view of a protractor head socket showing the part shown in Fig. 7 therein;

Fig. 9 is a view of a locking shoe shown in Figs. 3, 4 and 6;

Fig. 10 is an inner view of that part of the level shown in Fig. 1, and in section in Fig. 3;

Fig. 11 is an edge view of the opposite side shown in Fig. 2 and in section in Fig. 3;

Fig. 12 is a side view partly in section of a blade attachment and extension member;

Fig. 13 is a top view of the same;

Fig. 14 is a view of a slightly modified form of the tool showing blade attachment secured thereto and illustrating a method of use;

Fig. 15 is an elevation view of the same;

Fig. 16 is a view taken along the line 16—16 of Fig. 14;

Fig. 17 is a sectional view taken along the line 17—17 of Fig. 14;

Fig. 18 is a fragmentary view illustrating a method of use of the blade attachment and extension plug on a beveled or rounded edge;

Fig. 19 is an enlarged sectional view showing the blade grooves and the end of the blade attachment set screw;

Fig. 20 is a view showing the tool with a bar attachment adapted to be used as a depth gauge;

Fig. 21 is a sectional view taken along the line 21—21 of Fig. 20;

Fig. 22 is a perspective of the tool illustrating its use as a height gauge;

Fig. 23 is a view showing the use of a blade attachment for determining radii of small circular work using either the inside or outside circular portions as a determinate;

Fig. 24 is a face view of a modified form of my invention which has been considerably simplified;

Fig. 25 is a view similar to Fig. 24 showing the blade in position bisecting the inner right angle;

Fig. 26 is a sectional view taken along the line 26—26 of Fig. 24;

Fig. 27 is a sectional view taken along the line 27—27 of Fig. 24;

Fig. 28 is a perspective view of the positioning spring clip seen also in Figs. 24, 25 and 26; and Fig. 29 is an exploded view in perspective showing one of the blade seating members and securing means for same employed in the modified form of the tool.

Figure 1:
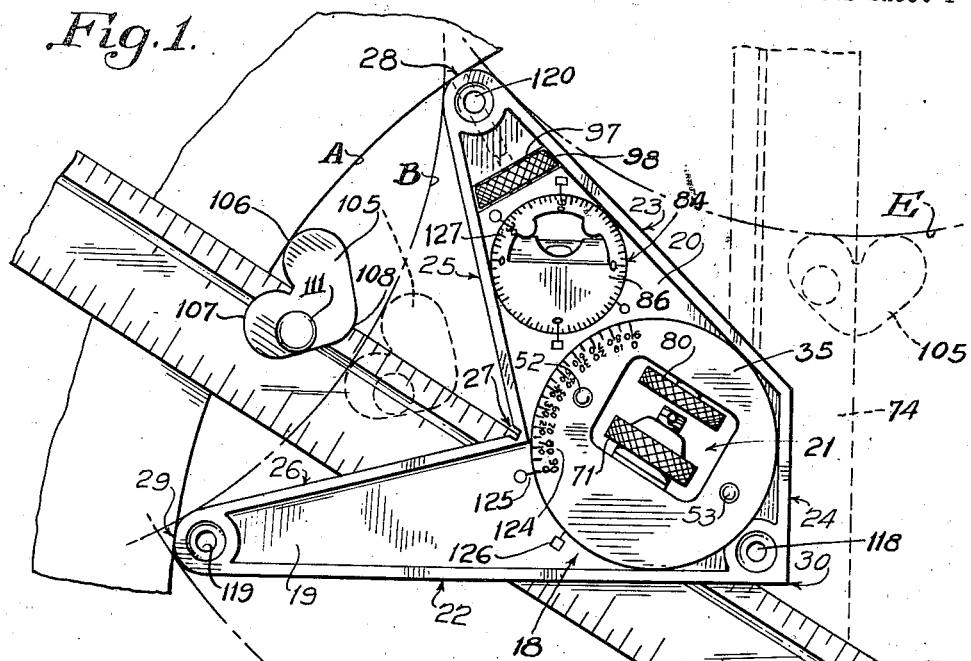
Fig. 1 is a view of one side of the tool showing the blade in a selected position in connection therewith.

Referring more particularly to the drawings, I show an embodiment of my invention which comprises a head 18 having two angularly disposed arms 19 and 20. A circular aperture 21, (Fig. 8), extends through the head 18 and seats a rotatable turret or protractor head which will be described more fully hereinbelow.

The side walls and end portions of arms 19 and 20 comprise work contacting faces 22, 23, 24, 25, 26, 28 and 29, of which the longest 22 is designated as the base surface. Face 24 is at right angles to face 22 and face 23 is at an angle of 45 degrees with face 22. Faces 25 and 26 are at right angles to each other and meet at an apex 27 which may be recessed to afford access to the exact angle of intersection of these faces. Faces 25 and 26 are of equal length for reasons which will become more apparent hereinafter. Faces 23 and 25 converge in a circular work contacting face 28, and faces 22 and 26 similarly converge in a circular work contacting face 29. A corner formed by intersection of faces 22 and 24 is designated 30 and will be specially referred to hereinafter.

Aperture 21 has a wall portion 31 and two rabbeted or recessed shoulders 32 and 33, (Fig. 3) for receiving the split rotatable turret or protractor head, detail parts of which are shown in Figs. 4 to 9. The protractor head comprises circular members 34 and 35, member 34 having circular sided portions 36 which fit within circular wall 31 for rotation, and a flange portion 37 adapted to fit in recessed shoulder 32. Member 34 has a straight faced portion 38 in which is a threaded bore 39 located centrally and transversely thereof. Diametrically opposite portion 38 a square groove is cut in portion 36 forming walls 40 and 41 and a substantially rectangular aperture 42 is formed in member 34. 34 is provided with counterbored bores 43 and 44.

Member 35 which is complementary to member 34 and is structurally substantially similar is shown as having a circular walled portion 45 which fits in bore 31, there being a right angle groove in portion 45 forming walls 46 and 47 which will be aligned with walls 40 and 41 when the protractor head is assembled. Member 35 has a flange 48 adapted to register with recess 33 and is provided with an aperture 49 which coincides with aperture 42 of member 34. Member 35 is provided with threaded bores 50 and 51 bored for alignment with bores 43 and 44 by which flat headed screws 52 and 53, (Fig. 2) secure members 34 and 35 in aperture 21 of the head. Portion 45 of member 35 is cut away opposite portion 38 forming a wall 54 against which portion 38 fits snugly when assembled.

A segment shaped binding shoe 55 is positioned between members 34 and 35 and has a smooth bore 56 centrally and transversely thereof. A blade seating member 57 (Figs. 4, 7 and 8), has a square block portion 58 in which is a transverse slot 59, the central portion of which is somewhat recessed as at 60 (Fig. 8) from the blade seating edge 57a. Block 58 is provided with a central bore 61 for a purpose to be presently explained.

Blade seating member 57 is formed with a pair of flat extension members 62 and 63 which are provided with elongated apertures 64 and 65 through which securing screws 52 and 53 extend. Member 57 is provided with shoulders 66 and 67 which, as may be seen from Figs. 7 and 8, are adapted to abut adjustable stop screws 68 and 69 suitably located in threaded bores in the head 18.

A blade clamping bolt 70 is adapted to slide in bore 61 and has a threaded end portion for a knurled thumb nut 71. The other end of the bolt is cut away on one side and has a transverse rib or bead 72 adapted to engage one of the longitudinal grooves 73 of a blade 74, which blade is the usual straight edge gauge or rule and has graduations in inches or centimeters and fractions thereof. The blade is shown as having one of the grooves 73 on each side and it will be observed that these grooves are closer to one edge than the other for reasons which will be more fully disclosed hereinbelow.

The head 18 and arm 19 are provided with a blade receiving slot 75. Fig. 16 shows said slot 75 to be located centrally and transversely thereof, the extent and depth of the slot being such as will permit the blade to be rotated from the full line position of Fig. 1 to the dotted line position thereof, the limits of such rotatability being indicated by the two stop screws 68 and 69, Fig. 8.

Block 58 and nut 71 are counterbored to receive a coil spring 76. The clamping bolt 70 has a small threaded cross bore 77 to receive a screw 78, an end of which projects beyond the side of bolt 70. A threaded binding screw 79 having a knurled head 80 engages threaded bore 39 in member 38 of circular member 34 and has a reduced end 81 which forms a shoulder 82, and 81 being adapted to fit in bore 56 of binding shoe 55, the free side of which bears against shoulder 82; the curve face of shoe 55 has the curvature of the wall or aperture 21 such that the tightening of screw 79 will lock the rotatable turret in aperture 21.

Arm 20 is provided with a second circular walled aperture 83 adapted to receive a rotatable level 84 comprising circular members 85 and 86. Aperture 83 is counterbored to form rabbeted seat 87 for flange 88 of member 86. The outer flat surface of which has degrees of the circle graduated thereon. In the opposite portion of wall 83 a deeper and beveled rabbet 89 is formed in which is positioned member 85 which has a circular flange portion 90 provided with bevel gear teeth 91. The flat face of member 85 has peripheral graduations in circular degrees and is bored and counterbored to receive flat headed screws 92 by which it is secured to member 86. Members 85 and 86 have registering semi-circular apertures 85a and 86a through which the spirit level can be seen. Member 86 has a cylindrical portion 93, which portion has a central diametrical bore 94 in which is secured a level glass 95. Four equally spaced threaded bores 96 are formed in cylinder 93 in which to receive screws 92 which hold members 85 and 86 together, and cylinder 93 is adapted to fit snugly within the circular flange portion 90 of member 85.

An elongated aperture 97 extends through arm 20 from side to side in which aperture is located a splayed knurled nut 98 which is provided with a square central aperture 99. A threaded bore 100 extends from face 28 in arm 20 and opens into aperture 97, and a continuation thereof extends into arm 20 into aperture 83. Pinion shaft 101 is rotatable in the extension of bore 100, and carries a bevel pinion 102 that meshes with bevel gear teeth 91 by which to rotate the level assembly. Shaft 101 has a squared portion adapted to fit in squared aperture of nut 98. Shaft 101 has a reduced end portion, a bearing for which is provided by the adjacent end of bore 100 which is smooth bored for a short distance to provide said bearing. A set screw 103 is carried in bore 100 and contacts the end of shaft 101 to permit adjustment of the engagement pinion 102 and bevel gear 91. A set screw 104 is provided in a cross bore connecting the bore 100 and serves to lock set screw 103.

Shown in Figs. 1, 12, 13, 14, 16 and 18 is a somewhat heart shaped blade attachment 105 having opposite flat faces and three circular work engaging faces 106, 107 and 108, and has a blade receiving slot 109. The bottom of slot 109 forms a seat for the edge of blade 74 and this seat bisects and is perpendicular to the common tangent of work faces 106 and 107, and bisects the geometrical center of face 108.

A threaded bore 110 is formed in one side of attachment 105 in which is fitted a knurled headed clamping screw 111, the inner end of which is formed parabolic (Fig. 19) and is so positioned as to engage one side of the longitudinal groove 73 of blade 74 whereby tightening effect of attachment 105 is effected as the bottom of slot 109 is pressed against an edge of blade 74. The end of screw 111 is formed rounded in this manner so that it can also be tightened against a flat part of the blade when it is desired to use the attachment without reversing the blade. On the opposite side of attachment 105 are three countersunk threaded bores 112, 113 and 114, the centers of which bores are the centers of the geometrical centers of circular work engaging faces 106, 107 and 108, respectively. A cylindrical extension plug 115 (Figs. 12, 13, 16 and 18) is shown having a threaded stud portion 116 and a threaded bore 117 which is also countersunk and bifurcated to permit use of a screw driver or such.

Head 18 is provided with a threaded countersunk bore 118 adjacent corner 30, and arms 19 and 20 are provided with threaded countersunk bores 119 and 120, respectively, adjacent circular work faces 29 and 28, respectively. The radius of plug 115 is the same as the distance from the center of bores 112, 113, 114, 119 and 120 to their respective circular work faces 106, 107, 108, 29 and 28, respectively. Similarly, this same radial distance is the same as the distance from the center of bore 118 from faces 22 and 24. By the use of one or more plugs 115 the effective length of the circular work faces 28 and 29 or surfaces 22 and 24 can be extended as clearly shown in Figs. 12, 16, 18, and 22. Likewise, the length of circular work engaging surfaces 106, 107 and 108 on attachment 105 may be extended. Two or more plugs 115 may be secured together by threading the one into the end of the other using stud portions 116 and threaded bores 117.

The tool may be used as a height or surface gauge as shown in Fig. 22 securing one or more plugs 115 in each threaded bore 118 and 119 so that the tool rests on face 22. The blade 74 may then be positioned vertically, and surface gauge of which there are many on the market may be attached thereto.

A polygon reading plate 121 (Figs. 2, 14 and 17) is secured as by screws 122 to head 18 adjacent protractor member 34. Plate 121 serves also to cover a notch 31a in circular wall 31 which notch is necessary to permit the introduction of blade seating member 57 which has the shoulders 66 and 67 as this member must be placed in position through circular aperture 21 as the first step in the assembly of the rotatable turret.

Identified by the numeral 123 (Figs. 20 and 21) I show a flat faced bar substantially L-shaped in cross section adapted to be rapidly attached or detached by means of a pair of U-shaped resilient clips 123a which are inwardly depressed to form the beads 123b formed to fit the countersunk bores 119 and 120 adjacent ends of arms 19 and 20. Extending one half the length of and located centrally of the bar 123 is a blade receiving slot 123c. This attachment is very useful for checking cylinder walls and the like, when it is snapped onto the tool with the blade at right angles to the face of the bar as in Fig. 20, scale 124 being read at indicating mark 125 will give the degree of angularity in regards to the blade and bar 123. The clips may be welded or riveted to the bar as shown.

Circular member 35 of the protractor head is shown to have a circular scale 124 (Fig. 1) graduated in degrees from zero to ninety with two rows of numerals which allows reading both ways. Head 18 bears two indicating marks 125 and 126 bearing symbols, mark 125 bearing a circular symbol and mark 126 bearing a square symbol. These indicating marks will register opposite one or the other of the zero ninety degree graduations of scale 124 when the blade 74 is in the position to bisect the interior angle and when it is at right angles to face 22, respectively, as indicated by the full and dotted line positions of the blade in Fig. 1.

The reading of the scale 124 with respect to indicating mark 125 will give a reading of the angle the blade 74 makes with respect to the bisector of the interior angle formed by faces 25 and 26. Similarly, readings of the scale 124 with respect to indicating mark 126 would indicate the angle formed by the blade 74 with respect to work face 22. Indicating marks similar to 125 and 126 are formed on both sides of arm 20 adjacent circular members 85 and 86 of level 84 which provides settings for either of the circular degree scales 127 laid out on members 85 and 86.

Circular member 34 of the protractor head (Fig. 2) is shown as having a scale 128 with graduations from zero to 12 and a scale 129 with graduations numbered consecutively from 3 to 10 and in addition 12, 14, 16, 18, 20 and 24. An indicating mark 130 is formed on head 18 adjacent scale 128 and readings of this scale with respect to mark 130 will register pitch or rise in inches and fractions thereof per foot of run measured by the angle between the blade 74 and work face 22.

Polygon reading plate 121 is provided with a scale 131 having graduations as shown numbered similarly to scale 129. The protractor head is set with two corresponding numbers on this scale opposite, for instance, 3—3 as shown (Fig. 2) is set to lay out the miter cut for a polygon of three sides with work face 22 against the work object and the mark being made along blade 74.

This feature is believed to be advantageous over devices heretofore used which have provided only one reading or indicating mark. As the miter cuts for many sided polygons are only one or two degrees apart, their respective lines and numbers are so close together as to make an accurate setting of the instrument difficult. By providing an individual reading mark on each scale 129 and 131 it is possible to set the protractor accurately to obtain the miter cut for the desired polygon. Certain polygons such as those having 11, 13, 15, 17, 21, 22 and 23 sides have been omitted from the scales as these are rarely used.

If and when an obstacle is encountered on the work object, or in the event that for any reason it is found impractical to use work face 22 after the blade has been set for any particular polygon, or bevel, the tool may be turned over and the degrees of angularity read on scale 124 using reading mark 126. The blade may now be swung into the enclosed angle and the protractor set to read at the same degree angle using the reading mark 125. Thus the circular work faces 28 and 29 which may straddle said obstacle may be applied to the work object and the blade will give the proper angle for the desired polygon miter or bevel cut.

In order to swing the blade from its one extreme position to the other as shown in Fig. 1, it is necessary that the blade receiving slot 75 extend the entire length of faces 22, 24 and 26. Any weakness this slot imparts to the tool is thought to be overcome by the novel design of the split protractor turret, and adjustable blade seating member, to wit:

If the sectional view Fig. 3 is studied, it will be noted that the rabbeted or recessed shoulders 32 and 33 formed in both sides of circular wall 31 are engaged by the flanges 37 and 48 as when i an assembled condition with the two parts that make up the protractor head 34 and 35 held firmly together by oversize screws 52 and 53. Any chance of the body spreading apart is eliminated. Moreover, any chance of the body being pinched together and binding on the blade is taken care of by the blade seating member 57, which should be slightly thicker than the blade 74. As may be noted in Fig. 8, the two projections of 57, namely 66 and 67 project into the slot beyond wall 31 and act as separators to maintain clearance for the blade. I consider the adjustable blade seat 57 to be a very important part of this tool. I believe it to be unique and novel in a number of ways when compared with the prior art.

Some degree of novelty is exercised in adapting the projections 66 and 67 to contact the stop screws 68 and 69 as heretofore these stop screws were contacted by the blade directly which results in wear as the blade is moved to and fro longitudinally. Obviously the resulting wear throws the tool out of adjustment, which seems to be overcome in the present arrangement as 66 and 67 make an abutting contact with stop screws 68 and 69.

If and when it is found necessary to adjust blade seat 57 to compensate for wear on same, this may be done by loosening the two screws 52 and 53 which pass through the elongated holes 64 and 65. It now becomes apparent that the square block 58 which is confined snugly between the walls 40 and 41 of one side of the protractor, and walls 46 and 47 of the other half of the protractor, may be moved laterally, but not angularly. I wish to emphasize this, for this reason: once this tool is adjusted at the factory, possibly the last operation would be to stamp the reading marks 125, 126 and 130 on the body 18 and adjust the polygon reading plate also. Any lateral adjustment thereafter would not affect these reading marks, but it is very obvious that an angular adjustment of the blade would. Of course, it is understood that the angular adjustment is taken care of by stop screws 68 and 69. Moreover, this method also eliminates the necessity of any accurate finish grinding of the blade seat with respect to the working faces as is now customary.

By those skilled in the art it is known to be of considerable advantage to have one edge of the blade stand clear of the head regardless of the degree or angle at which they may be temporarily related. As a means to this end, it has been customary heretofore to remove all interfering corners from the head, or to form that portion of the body adjacent the protractor head generally circular in contour or to substantially widen the blade. Different means are employed in the present embodiment, to wit: The present protractor head is reduced to a minimum size, due consideration being had for accessibility to knurled nut on the clamping bolt. Due consideration is also given to the length and capacity of the blade seating surface which is deemed sufficient. This smaller protractor head allows it to be disposed in close proximity to corner 30 and when combined with blade 74 on which the groove 73 is removed from its customary central position to a position adjacent one edge thereof, it becomes apparent one edge of the blade and the graduations thereon will extend clear of corner 30. It is understood that said blade is of a width that is popular and in common use, being preferable by reason of its width being a unit of measurement.

Figure 2:
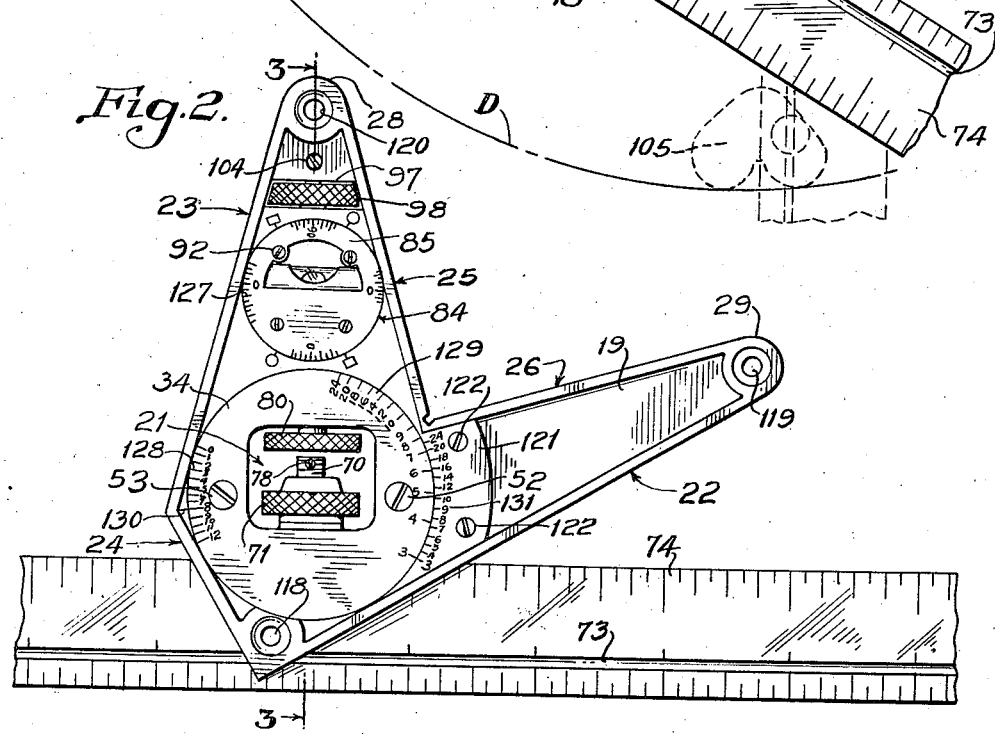
Fig. 2 is a view of the opposite side of the tool showing the blade in another selected position.

From the above described construction which is illustrated in Fig. 2, it is shown that corner 30 which does not interfere with blade 74 need not be removed as heretofore resorted to. Furthermore, it is considered advantageous by those skilled in the art to form two working faces integrally, joined and disposed at an angle of 90 degrees one to the other. Such construction is indicated by face 24 intercepting and arranged at right angles to face 22 which allows of complementary angles being disposed on the work object without mental calculation. Although this right angle formed by two working faces may be arranged on other parts of the body remote to the protractor head, preference is given to a position close to the axis of rotation of the blade which allows said blade to be extended from the head and utilized to its fullest extent.

The manner in which complementary angles may be disposed on the work object when laying out rafters, braces, etc., may be made clear by referring to Fig. 2 which shows the tool set to mark the cut on a rafter having 8 inch rise to 1 foot run, commonly called one-third pitch. After face 22 has been engaged to the rafter and the bottom cut marked along the blade, the top or complementary cut is obtained by engaging face 24 to the work and the mark is again made along the blade 74, thus both cuts can be disposed on the work with but one setting of the blade. Another method may be resorted to if the short face 24 is considered to be of insufficient length or acts unstable when engaged to the work object. The long face 22 may be used for marking both cuts as follows: If the degree scale 124 is consulted, two rows of numbers will be found thereon reading both ways from zero to ninety. Assuming that the blade is still in the same position as shown in Fig. 2, it will be found that the indicating mark 126 will show on the row of numbers that read from right to left, that the degree of angularity existing between face 22 and the blade 74 is approximately 34 degrees. On the other row of numbers reading from left to right, reading mark 126 will also indicate that 56 degrees is complementary to 34 degrees, and the blade may be swung into this angle and face 22 applied to the work to obtain the ridge cut on a rafter for a roof of one-third pitch. Thus it is obvious the pitch scale 130 works in harmony with the degree scale 124. The degree of angle of any pitch may be quickly ascertained, or vice versa, without any mental calculation. The same can be said to be true in regards to the cooperation existing between the polygon scale 129 and the degree scale 124 as it is often convenient to know just what the angle a certain polygon miter cut amounts to.

In scribing a line a predetermined distance from the arcuate edge of a surface to be so marked, it is customary for the mechanic to employ the old-fashioned center square. While this is a worthy tool when used for its intended purpose of center finding, it functions poorly when used as a circular scribe. For example: Assume that it is desired to scribe a line parallel and co-centric to the edge of and from end to end of a curved segment. Certain difficulties are encountered.

First: If the edge of the material engaged by the terminals of the tool be not quite smooth, said terminals are very apt to dig in and chatter, resulting in a wobbly line at variance with the contour of the edge. Very little consideration is given to this part of the tool in manufacture heretofore, some tools having but slightly rounded work engaging ends while others are cut off blunt or square and present sharp corners to the work object. Obviously, any small work object such as would be confined within the angle would not be affected. The difficulties mentioned pertain to curved or circular work having a larger radius, say from one foot up.

Second: The desired line can not be scribed from end to end, it being apparent that one arm of the tool will run off the end of the segment before the scribing element has completed said line. I overcome the first difficulty by providing the circular work contacting faces 28 and 29 which will glide along the edge of the work object, be it smooth or rough such as would result from band sawing or such. I overcome the second difficulty by providing the small heart shaped blade attachment 105. The use of which allows a line to be scribed from end to end of the work as shown in Fig. 14, and to the best of my knowledge no tool has ever been provided that would do this.

Moreover, it is another object of this invention to provide means whereby a rapid and accurate squaring or mitering of the ends of arcuate segments of work can be accomplished without the attendant waste of material heretofore resulting from the use of the familiar center square (referred to above) or other such tool for this purpose. By using the means I provide in the blade attachment 105, the desired miter or radial cut may be marked or disposed upon and at the extreme terminus of whatever circular segments of material that are being worked upon. This is considered desirable as the workman is often required to use material that is expensive.

One manner of doing this is demonstrated in Fig. 14 where the three faces 28, 29 and 108 are shown engaging or contacting the arcuate edge of the work object C and shows how the two difficulties mentioned above are overcome, namely, to scribe a line from end to end on the work object and to mark the desired cut at the extreme terminus of the material. Another manner is shown at Fig. 1, an explanation of which follows.

In Fig. 1 I seek to show how the heart shaped gauge 105 may be used to advantage. Assuming I have a work object in the form of a circular segment, one edge of which might be of a radius such as is indicated by the full line A, and desiring to square both ends of this material, I place the tool in such a position that the faces 28 and 29 will contact the work and with the blade 74 lying flat on the work, I slide the gauge 105 along the blade until the faces 106 and 107 will engage said work. 105 may now be fixed in this position by screw 111.

I now have a tool comprising a plurality of circular work engaging surfaces (an arc conformator). If the tool as a whole is moved to a position adjacent the end of the work or to the right, for instance, faces 28 and 106 will extend past the same, but faces 29 and 107 will still bear against the work object and a right line may be marked along indexing edge of blade 74 which is located between 106 and 107. Of course the other end of the work may be marked in like manner. Thus it is obvious that I provide simple means whereby a radial cut or other line may be marked or disposed at the extreme terminus of a work object.

In using this improved tool for the purpose described above and in the manner described above no trouble should be encountered on any work the radius of which is confined to the smaller brackets, but as the radius is increased, the circumference approaches a straight line. It is apparent that the faces 28, 106, 107 and 29 will also approach a straight line and the bearing span will be decreased accordingly between faces 28 and 106 or 29 and 107. When a situation like this arises or at any time the tool acts unstable when applied to the work, or if there are many pieces of work to be marked, or if there were any obstruction on the work which would cause one of the diverging arms to interfere, another manner of doing this work is shown by dotted line D which is the same radius as A.

In this case 28 and 29 are applied to the work in a spot where the radius is known to be true, then a line is drawn on the work along indexing edge of blade 74. The blade may now be swung to its opposite extent of rotation or any suitable intermediate point. The blade is now laid back on the work and brought to register with said line and at the same time 105 is adjusted and clamped in position, thus faces 29, 106 and 107 will contact edge of work and the tool as a whole may be moved to the terminus of the work object as before, but will have to be turned over if it is desired to mark a cut on the opposite terminus of work object. Thus it is clear the span between the contacting faces may be increased at will.

As for the dotted lines B and E in Fig. 1, any explanation in regards to these would only be a duplication of the above. As the tool may be used in a similar manner when applied to the periphery of an arc, the only difference being shown is 105 fixed on the other edge of the blade when engaging dotted line E. When used thusly, the round terminus of screw 111 is brought into use and bears directly on blade 74. Personally, I would only use this manner of fixing 105 on the blade as a last resort as it can be avoided by turning the blade end for end, while on the other hand I wish to show that the attachment 105 can be used in the manner just described and readily attached to the blade of those squares now in common use wherein the groove is located centrally thereof.

While on the subject of scribing, mention should be made of another worthwhile function peculiar to this tool. I refer to the manner in which a line may be scribed parallel to the edge of any work object having an irregular outline such as an ogee curve for example. Reference is now made to Fig. 14 which shows faces 28, 29 and 108 contacting the curve edge of a work object C. Now let it be assumed that said edge were to be extended to show an ogee curve and it is desired to scribe a line parallel to the same. The manner in which this can be done is very simple and is as follows: The gauge 105 is fastened on the blade as shown in Fig. 14 with the factor or amount of parallelism extending from face 108 to end of blade and if knurled nut 71 is left slightly loose the blade will be allowed to move in or out as the tool as a whole is moved along the irregular curve. A slight pressure is needed to keep face 108 in steady contact with the work, the curvature of 108 adapts it to contact either a concave or convex edge. The desired result may be easily accomplished. Thus another handy use is found for this small heart-shaped attachment 105.

Moreover, in Fig. 23 I show that the blade and attachment 105 form a center square of small proportion very useful for locating the center or marking radial lines or such on a small work object, such as the cylinder F, showing that the circular faces 106 and 107 may be engaged to the inner or outer cylindrical surfaces of such an object.

The curvature of the rounded or semi-cylindrical work contacting faces 28 and 29 could be of a form other than truly circular, such as ellipsoid, cycloid, paraboloid, etc., but I consider the form illustrated in the present embodiment advantageous as it allows the cylindrical plugs or extensions 115 to be used as shown in Figs. 16 and 18. As each and all of the circular work contacting faces 28 and 29, 106, 107 and 108 are all of the same radii and are bored and threaded at their respective axis and the extensions 115 are of a similar radius and have the threaded extensions, it is obvious that a simple, inexpensive and novel means is provided to extend said faces laterally from either side of the tool for a purpose that will be instantly recognized and appreciated by those skilled in the use of such tools, who are often required to mark a cut on the surface of material that presents a molded or beveled or such edge as cannot be properly contacted by the working faces of the square. I believe that Fig. 18 will explain this matter as it shows the method and advantage of extensions as applied to work having such a form.

Moreover, when such a molded work object is straight and it is desired to make a square or any polygon miter cut face 22 may be extended by screwing an extension 115 into threaded bore 119 of 29, and another extension 115 in threaded bore 118 which is located adjacent corner 30. Moreover, if the two extensions just mentioned are not long enough to reach a bearing surface, two more extensions may be screwed into them as the threaded bore 117 shown in Figs. 12 and 13 are there for that purpose.

New and convenient means are provided to facilitate the operation of reversing the facing position of the blade. When it is desired to reverse the blade either side for side or end for end, merely unscrew knurled nut 71 until it binds on pin 78. The blade can then be withdrawn, turned over side for side and readily reinserted.

If the blade should be turned end for end after it is withdrawn, it is obvious the clamping bolt 70 will have to be rotated 180 degrees before it can be reinserted, as the lugs or ears formed on clamping bolts and their cooperating keyways or guiding grooves commonly used heretofore are dispensed with. The clamping bolt 70 may be freely rotated by turning nut 71, if and when said nut 71 is in binding contact with screw 78. Moreover, the projecting head of screw 78 is so positioned in the bolt 70 that it always indicates the relative position of the transverse bead 72; this facilitates aligning bead 72, (which is otherwise concealed) with the groove 73 of blade 74. This is a very simple, economical and convenient means for obtaining the desired result.

A lengthy discourse on the many and varied functions which may be performed by the handy little adjustable level is not necessary. I believe it will fill a long felt want and should find much favor among those who are familiar with the use of such tools, to whom the old uses will be apparent and the new ones will readily suggest themselves.

As referred to heretofore, it will be noted that I use the same symbols for the indicating marks as shown in Fig. 1. The level is set to indicate that any work engaged by face 22 would be level or horizontal while on the other hand if the work were engaged by the blade in dotted lines, the work would be plumb or vertical and would be read at the lower square reading mark. The upper would be used if face 22 were engaged to underside of soffit of the work. Of course in this latter position, the level would have been rotated 180 degrees.

The same explanation applies to the manner of using the circle reading marks which are to be used if the bar 123 were in a working position as shown in Fig. 20, or when the work object is contacted by faces 28 and 29, and when so used it is obvious that any circular object standing in a vertical position could be laid off into halves, quarters or any number of parts or degrees. Also note that both sides of the level are graduated into degrees and both sides of arm 20 have similar indicating marks. This allows the tool to be used in an ambidextrous manner for leveling or plumbing purposes.

In order to use the level to the best advantage, it is obvious that the work object should be in an upright or vertical position and as many mechanics' work is confined to a horizontal or flat plane, a tool without the level would answer their needs and result in some saving. I show such a tool in Fig. 14 which shows the level aperture as a handy place to carry the heart-shaped gauge 105 when it is not in use but is available at all times and not apt to be left in a tool box or other place.

In this form of the tool the rotatable level 84 is eliminated and the space otherwise occupied by it is used for the attachment. The arm 20 is provided with a circular aperture 132 adapted to receive the attachment 105 which may be placed therein and turned about a quarter turn and secured against loss by tightening screw 111 to a web 133 interfitting with slot 109.

In Figs. 24 to 29 I show a modified form of my invention. In this form the square is simplified and is intended to be used principally as a handy tool for work requiring either the use of a square or center bead. In this modified form the features of the form of Figs. 1 to 19 have been carried out as far as possible with particular reference to accuracy and adjustability, provision being made for resetting of the blade adjusting means after wear. In this embodiment I show a head 135 having arms 136 and 137 corresponding to arms 19 and 20 having a base edge or work face 138, a work face 139 at right angles thereto, and a work face 140 at 45 degrees from face 139. An inside right angle recess is formed by work faces 141 and 142 which meet at a recessed apex 143. Circular work engaging faces 144 and 145 are formed at the ends of arms 136 and 137 to correspond to work faces 28 and 29. Arm 137 is provided with a blade receiving slot 146 which after being cut is filled in with a block 147 which is held by rivets 148 in order to strengthen the arm.

Head 135 is provided with an aperture 149 having a semicircular wall portion 150. Faces 138 and 139 meet in a corner 151 and adjacent this corner a boss 152 extends into aperture 149. A smooth bore 153 is formed in boss 152 and receives an adjustable blade seating pin 154. A blade holding member 155 having a recess 156 for interfitting with boss 152 is provided with a bore 157 for pivot mounting on pin 154 in bore 153. Member 155 is provided with a bore 158 to receive a blade clamping bolt 159 similar to bolt 70 of my hereinabove described embodiment. Bolt 159 has a threaded end portion 160 for a knurled thumb nut 161. The other end of the bolt is cut away on one side and has a transverse rib or bead 162 adapted to engage one of the longitudinal grooves 163 of a blade 164. Member 155 and nut 161 are counterbored to receive a coil spring 165. Bolt 159 is provided with a small crossbore in which is a set screw 166 similar to screw 78.

Head 135 is provided with smooth bores to receive seating pins 167 and 168 which are structurally identical with pin 154 and each of these pins is formed with a blade receiving recess 169 forming a blade seating surface 170 which is circular, however, eccentric with respect to the axis of the pins. Surface 170 is undercut at 171 so as to make the width of surface 170 slightly less than that of the thickness of the blade 164 so that the corner edges of the blade, should they become nicked or damaged, will not bind in recess 169 should dirt accumulate therein. Pins 154, 167 and 168 each have a serrated end portion 172 adapted for engagement with a serrated aperture 173 of a lock washer 174 which may be secured to pin by a cap screw 175 screwed into a threaded bore 176 of each pin. Each washer 174 has an elongated slot 177 adapted for engagement with a lock screw 178, bores for which are provided in head 135 and member 155, recesses 179 being formed in the head and member 155, respectively, so that the heads of screws 175 and 178 will not extend above the surface of the head.

It will therefore be seen that pins 154, 167 and 168 may be adjusted with very fine settings to any circular position, changes in which will change the position of blade 164 which can thus be accurately set for the right angle and center square positions even after long use and wear on the blade seating surfaces, and furthermore it will be clear that no accurate machining of blade seating surfaces is required as heretofore in manufacture. Pins 154, 167 and 168 are each formed with a screw driver slot 180 by which the pins may be turned for making adjustment, while screws 178 are loosened or removed if necessary to shift the position of washer 174 to another position on serrated portions 172.

Semi-circular wall 150 is provided with a pair of grooves 181 and 182 slightly V-cut to receive the correspondingly shaped end 183 of a spring clip 184 which is provided with a pair of screw holes 185 for the reception of screws 186 by which it is secured to member 155. Head 135 is cut away as at 187 at the ends of grooves 181 and 182 to permit entrance of a finger or thumb nail to release clip 184 for changing the position of the member 155 in shifting blade 164 from a position where it is at right angles to face 138 as shown in Fig. 24 to a position where it bisects the enclosed angle formed by faces 141 and 142 as shown in Fig. 25, or vice versa.

Arms 136 and 137 are provided with countersunk threaded bores 188 and 189 cocentric with the circular work engaging faces 144 and 145 for the attachment of plugs 115 in the manner and for the uses hereinabove described in connection with the tool of Figs. 1, 2 and 14.

Having described my invention, what I claim is:

1. A tool as described comprising a head having a pair of arms extending angularly therefrom, side portions of said head and arms having work engaging surfaces, one of said arms having a blade receiving slot, a blade adapted to be adjustably positioned in said slot and having a groove extending the length thereof closer to one side than the other, a protractor head rotatably mounted in said tool head and having blade seating and engaging means, said means including a seating member, a bolt having a transverse bead adapted to engage said blade groove, a lock nut on said bolt, and a stop on said bolt for said lock nut when in retracted position whereby said bolt may be turned by said lock nut.

2. A tool as described, comprising a head having a pair of arms extending angularly therefrom, said head and arms having a blade receiving slot, a circular aperture in said head, a two-part blade securing turret rotatably mounted in said aperture, a U-shaped blade seating element adjustably secured between said parts in the plane of said slot and having a block portion provided with a blade receiving slot and a bore, a reversible bolt in said bore having a blade groove engaging bead, and a stop pin adapted to indicate the position of said bead.

3. A tool as described, comprising a head having a pair of arms extending angularly therefrom, said head and arms having a blade receiving slot, a circular aperture in said head, a two-part blade securing turret rotatably mounted in said aperture, a U-shaped blade seating element adjustably secured between said parts in the plane of said slot and having a block portion provided with a blade receiving slot and a bore, a reversible bolt in said bore having a blade groove engaging bead, a spring seated nut on said bolt adapted to bias said bolt so as to firmly retain the edge of the blade in contact with said blade seating element.

4. A tool as described, comprising a head having a pair of arms extending angularly therefrom, said head and arms having a blade receiving slot, a circular aperture in said head, a two-part blade securing turret rotatably mounted in said aperture, a U-shaped blade seating element adjustably secured between said parts in the plane of said slot, means including a resilient element adapted to engage a blade and bias the same toward said blade seating element, an abutment on said blade seating element, and an adjustable stop in said head extending into said slot adapted to engage said abutment whereby to determine a selected angular position of said blade with respect to said head and arms.

MALCOLM KEEGAN.